(12) United States Patent
Bimbaud et al.

(10) Patent No.: US 10,033,437 B1
(45) Date of Patent: Jul. 24, 2018

(54) MOBILE PHONE WALLET

(71) Applicant: STMicroelectronics (Tours) SAS, Tours (FR)

(72) Inventors: Igor Bimbaud, Mettray (FR); Eric Colleoni, Monnaie (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 15/702,207

(22) Filed: Sep. 12, 2017

(30) Foreign Application Priority Data

Jan. 31, 2017 (FR) ...................................... 17 50773

(51) Int. Cl.
| | | |
|---|---|---|
| *H04M 1/00* | (2006.01) |
| *H04B 5/00* | (2006.01) |
| *G06K 19/07* | (2006.01) |
| *H02J 7/00* | (2006.01) |
| *H04M 1/02* | (2006.01) |
| *H04B 1/3888* | (2015.01) |

(52) U.S. Cl.
CPC ....... *H04B 5/0037* (2013.01); *G06K 19/0704* (2013.01); *H02J 7/0054* (2013.01); *H04B 1/3888* (2013.01); *H04M 1/0202* (2013.01)

(58) Field of Classification Search
None
See application file for complete search history.

(56) References Cited

U.S. PATENT DOCUMENTS

| | | | | |
|---|---|---|---|---|
| 6,978,940 | B2* | 12/2005 | Luu | G06K 7/0034 235/485 |
| 6,991,172 | B2* | 1/2006 | Luu | G06K 19/072 235/492 |
| 7,865,141 | B2* | 1/2011 | Liao | G06Q 20/32 235/439 |
| 8,462,062 | B2 | 6/2013 | Westrick et al. | |
| 8,548,924 | B2* | 10/2013 | Yeager | G06Q 20/367 235/375 |
| 8,670,801 | B2* | 3/2014 | Levionnais | G06K 7/0008 455/558 |
| 8,725,222 | B2* | 5/2014 | Phillips | G06K 19/005 455/556.1 |
| 8,733,648 | B2* | 5/2014 | Melbrod | G06K 19/12 235/380 |
| 8,843,125 | B2* | 9/2014 | Kwon | H04L 63/067 455/419 |

(Continued)

FOREIGN PATENT DOCUMENTS

EP 1814057 A1 8/2007

OTHER PUBLICATIONS

INPI Search Report and Written Opinion for FR 1750773 dated Oct. 6, 2017 (9 pages).

*Primary Examiner* — Tuan A Tran
(74) *Attorney, Agent, or Firm* — Crowe & Dunlevy

(57) ABSTRACT

A case includes a base for receiving a portable phone and a flap hinged to the base and including a housing configured to receive a microcircuit card. A first contactless communication antenna is provided in the flap for coupling to an antenna of the microcircuit card. A second contactless communication antenna is provided in the base for coupling to an antenna of the portable phone. The first and second first contactless communication antennae are electrically connected to each other.

12 Claims, 3 Drawing Sheets

(56) References Cited

U.S. PATENT DOCUMENTS

| | | | | |
|---|---|---|---|---|
| 8,918,855 B2* | 12/2014 | Singh | ............ | G06F 21/35 |
| | | | | 726/9 |
| 9,026,187 B2* | 5/2015 | Huang | ............ | H05K 5/0086 |
| | | | | 455/575.8 |
| 9,054,408 B2* | 6/2015 | Florek | ............ | G06K 19/07732 |
| 9,088,066 B2* | 7/2015 | Levionnais | ............ | G06K 19/07773 |
| 9,123,935 B2* | 9/2015 | Huang | ............ | H01M 10/46 |
| 9,160,416 B2* | 10/2015 | Wilson | ............ | G06Q 20/341 |
| 9,209,851 B1* | 12/2015 | Wilmhoff | ............ | H01Q 1/245 |
| 9,491,273 B2* | 11/2016 | Levionnais | ............ | H04M 1/04 |
| 2009/0170559 A1* | 7/2009 | Phillips | ............ | H01Q 1/243 |
| | | | | 455/556.1 |
| 2011/0263292 A1* | 10/2011 | Phillips | ............ | G06K 7/10168 |
| | | | | 455/556.1 |
| 2014/0203020 A1 | 7/2014 | Trombino | | |
| 2014/0282059 A1 | 9/2014 | Oh et al. | | |
| 2015/0011273 A1* | 1/2015 | Wilmhoff | ............ | H01Q 1/245 |
| | | | | 455/575.7 |
| 2016/0063485 A1 | 3/2016 | Tunnell et al. | | |

\* cited by examiner

MOBILE PHONE WALLET

PRIORITY CLAIM

This application claims the priority benefit of French Application for Patent No. 1750773, filed on Jan. 31, 2017, the disclosure of which is hereby incorporated by reference in its entirety to the maximum extent allowable by law.

TECHNICAL FIELD

The present description relates generally to the recharging of microcircuit cards (smartcards) equipped with a rechargeable battery and with a near field communication antenna.

BACKGROUND

A distinction can be drawn between microcircuit cards (smartcards) equipped with a near field communication antenna according to whether or not they include a battery. A first category of cards does not include a rechargeable battery and the microcircuit can function only when the card is in a contactless communication situation with a terminal. A second category to which the present description more particularly applies relates to cards for which the electronic circuit or circuits remain powered even when the card is not in the field of a terminal generating a near field communication electromagnetic field. These cards hence incorporate a rechargeable battery, typically a thin-film type battery.

This battery must be able to be recharged. Today, the user can periodically place the card on the casing of a charger equipped with a near field communication antenna to provide the recharging.

It would be desirable to have a solution for easily recharging a microcircuit card with a battery.

It would be desirable to have a solution that is particularly easy to implement for the user.

SUMMARY

Thus, one embodiment provides for a case with a flap for a portable phone, including, in the case; at least one housing intended to receive a microcircuit card; and at least one first contactless communication antenna, the first antenna being electrically connected to a second antenna placed in a base of the case.

According to one embodiment, the housing is accessible from the inside of the flap.

According to one embodiment, the housing is accessible from the outside of the flap.

According to one embodiment, the said housing is accessible via a slot into which the card is intended to be inserted.

According to one embodiment, the base of the case is intended to be facing a face of the phone carrying a third contactless communication antenna.

According to one embodiment, the first antenna is intended to be facing an antenna of the microcircuit card.

According to one embodiment, the electrical connection between the first and the second antenna passes through a hinge linking the flap to the base of the case.

According to one embodiment, the thickness of the base and of the flap is chosen to be able to house therein the second antenna and the first antenna respectively.

According to one embodiment, the antennas are formed by flat conducting windings.

According to one embodiment, the flap incorporates a metal plate on the outer side, intended to screen the first antenna.

According to one embodiment, the case includes at least one housing accessible from the inside of the flap and at least one housing accessible from the outside of the flap.

One embodiment provides a method for recharging a microcircuit card with a battery, in a case, including the following steps: placing a portable phone in the case; placing the card in a housing in the flap of the case; and recharging the battery of the card using the battery of the portable phone, the energy passing through an antenna of the portable phone, the second antenna, the first antenna and an antenna of the card.

In an embodiment, a case comprises: a base configured to receive a portable phone; a flap coupled to the base, wherein the flap includes: at least one housing configured to receive a microcircuit card; and at least one first contactless communication antenna configured to couple with the received microcircuit card; and wherein the base comprises a second contactless communication antenna configured to couple with the received portable phone, the second contactless communication antenna being electrically connected to the at least first contactless communication antenna.

In an embodiment, a method for recharging a microcircuit card that includes a first battery comprises: placing a portable phone including a second battery in a base of a case that includes a flap; placing the microcircuit card in the flap of the case, where the case includes a first contactless communication antenna in the flap configured to couple with the received microcircuit card and a second contactless communication antenna in the base configured to couple with the portable phone, said first and second contactless communication antennae being electrically connected to each other; and recharging the first battery of the microcircuit card using the second battery of the portable phone by passing energy through an antenna of the portable phone, the second contactless communication antenna, the first contactless communication antenna and an antenna of the microcircuit card.

BRIEF DESCRIPTION OF THE DRAWINGS

These features and advantages, as well as others, will be described in detail in the following description of particular embodiments, which description is given in a non-limiting manner with reference to the accompanying figures in which.

DETAILED DESCRIPTION

The same elements have been denoted by the same references in the various figures.

For the sake of clarity, only items helpful for understanding the embodiments which will be described have been represented and will be detailed. In particular, the operation and structure of the whole of a radio-frequency transmission chain have not been detailed, the embodiments described being compatible with the usual transmission chains. In the description that follows, when reference is made to the terms "approximately", "about" and "in the order of", this indicates within 10%, preferably within 5%.

Figure 1:
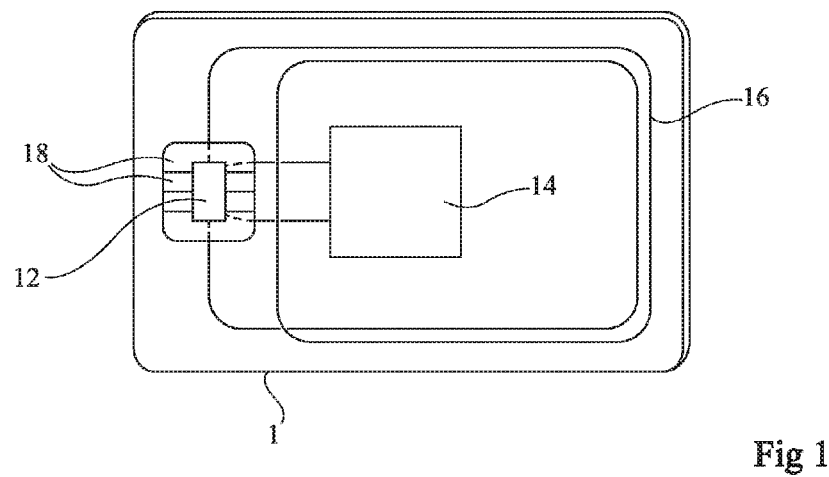
FIG. 1 is a schematic representation of a microcircuit card.

Here FIG. 1 is a schematic view of a chip card or microcircuit card (smartcard), equipped with a battery.

The card 1 generally has a rectangular shape having sides a few centimeters long and a small thickness (less than 2-3 millimeters).

The card 1 includes at least one electronic circuit 12 and, in the applications targeted by the present description, a battery 14, preferably a thin-film battery, and a contactless communication antenna 16. If necessary, the card 1 also includes electrical contacts 18 intended to be in contact with corresponding contacts of a terminal (not represented). The two ends of the antenna 16 are connected to the circuit 12, and the two terminals of the battery 14 are also connected to the circuit 12.

The representation of FIG. 1 is schematic. In particular, the respective positions of the various elements can vary. Likewise, the size of the antenna 16 depends on the applications. The antenna 16 can, if necessary, be borne by a face of the thin-film battery 14.

In the applications targeted by the present description, the microcircuit card is, for example, a card that can be used in banking applications, storing a key in the manner of a token and which are equipped with a displayer of the value of the token. Another example relates to cards incorporating biometric sensors or other sensors. Yet another example relates to bank cards storing the value of an electronic purse, etc.

The inventors propose taking advantage of the presence, in mobile phones or portable phones, of a communication antenna and a battery of higher capacity than that equipping microcircuit cards. This is because the majority of card users are moreover equipped with a mobile phone which they have with them permanently or for most of the time, so that recharging via the phone does not deprive them of the card, unlike a recharging terminal.

In particular, a portable phone (smartphone) equipped with a near field communication antenna generally bears this antenna on the rear face, typically in a rear cover of the phone. The antenna is generally arranged at the casing or shell of the phone in order to not be screened by metal elements. Due to these metal elements and the fact that the antenna generally includes a reflector, it can transmit and receive an RF signal only to/from the rear of the phone. The antenna is connected to the electronic transmission circuits inside the phone. Moreover, a portable phone includes a battery. This battery can serve as a power source to recharge the battery of a microcircuit card.

Figure 2:
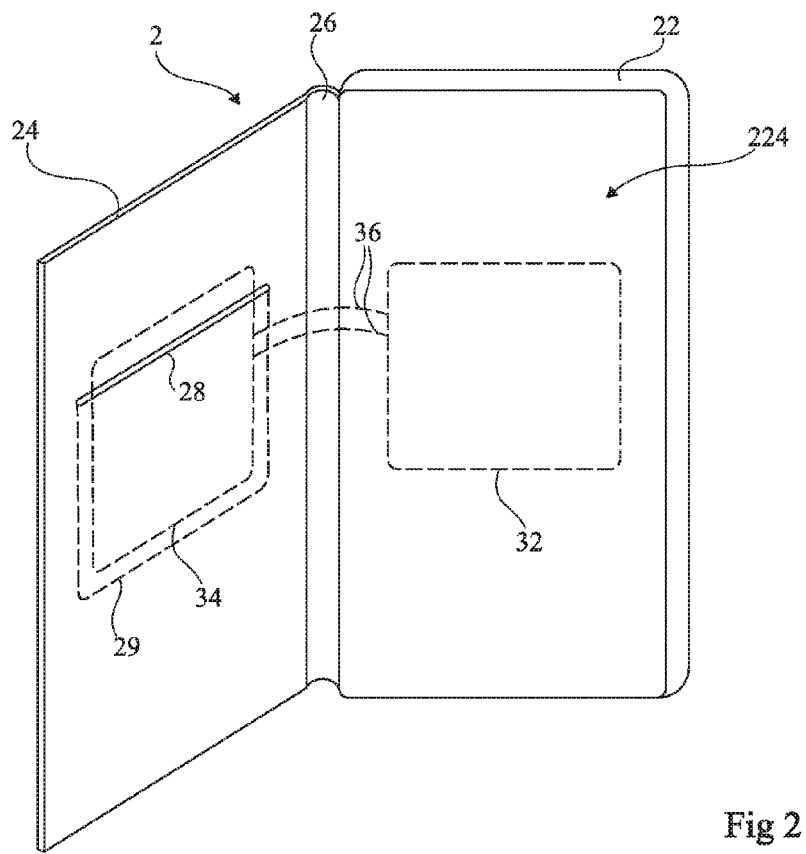
FIG. 2 is a schematic representation of an embodiment of a case for a portable phone.

FIG. 2 is a schematic perspective representation of an embodiment of a case 2 for a portable phone.

Figure 3:
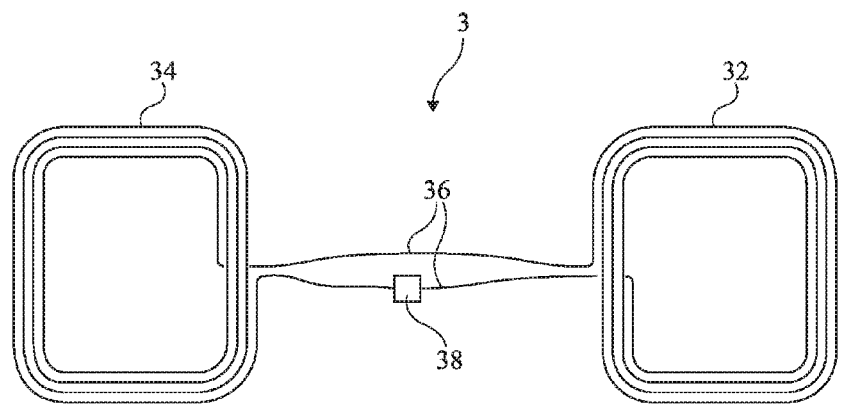
FIG. 3 is a schematic representation of an embodiment of an antenna system of the case of FIG. 2.

FIG. 3 schematically represents an antenna system 3 intended to be contained in a case of the type of that of FIG. 2.

According to this embodiment, the case 2 is a case with a flap, in the style of a wallet.

The case 2 includes a first part 22 or base, defining a housing 224 or a receiving shell for a portable phone (not represented) and a flap 24 linked to the base 22 by a flexible hinge 26. The case 2 has, in this example, a general rectangular shape when the flap 24 is folded onto the shell to close the case 2. The base 22 and the flap 24 are of sufficient thicknesses to each incorporate at least one flat antenna of an antenna system (3, FIG. 3). In FIG. 2, examples of areas in which these antennas are etched have been represented in dotted-line. Furthermore, the inner face of the flap 24 includes at least one slot 28 for accessing a housing 29 for receiving (arranging) a microcircuit card 1.

At least one antenna 32 is incorporated in the base 22. The antenna 32 is formed by a flat conducting winding, the production of which is in itself usual. The two ends of the antenna 32 are connected by wires 36 to two ends of at least one antenna 34 incorporated in the flap 24. The antenna 34 is also formed by a flat conducting winding.

The role of the antenna structure 3 is to capture the energy radiated by a contactless communication antenna (NFC—Near Field Communication) of the phone facing the base 22, and to transfer this energy into the antenna 34 in the flap 24 in order that it can be captured by a card 1 (more specifically by the antenna 16 of a card 1) housed in the housing 29.

A filter 38 (typically a capacitive element) is inserted in the path of the conductors 36 connecting the two antennas 32 and 34. The role of this filter is to create, if necessary, an antenna system preferably resonating at a frequency identical to that of the near field communication system used, for example 13.56 MHz in the case of the NFC standard.

Figure 4:
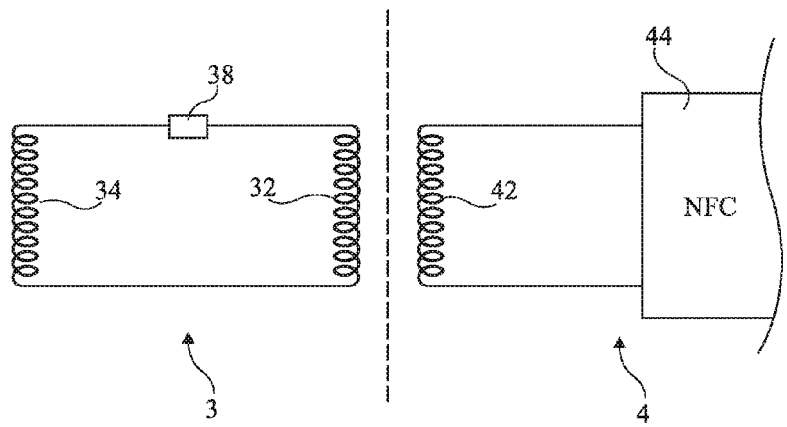
FIG. 4 illustrates the equivalent circuit diagram of the antenna system in coupling with an antenna of a phone.

FIG. 4 illustrates the equivalent circuit diagram of the antenna system 3 in coupling with an antenna 42 of a mobile phone 4 placed in the housing 224. The antenna 42 is connected, at the phone 4 end, to one or more electronic circuits 44 including in practice an NFC router.

The antennas 32 and 34 (FIG. 3) can be different (in terms of the number of turns, areas and impedances). Preferably, the antenna 32 is identical (in terms of the number of turns, area and impedance) to the antenna 42 of the phone 4 in order to maximize their coupling. Preferably, the antenna 34 is identical (in terms of the number of turns, areas and impedances) to the antenna 16 of the card 1, again to maximize their coupling.

The structure 3 plays the role of an element in a way replicating the antenna 42 of the phone in the flap 24 of the case 2. The size and shape of the case 2 are adapted for the model of the portable phone 4 for which the case 2 is intended. Likewise, the model of the phone 4 influences the position of the antenna 32 placed within the thickness of the shell 224.

According to a variant embodiment, the outer face of the flap 24 includes a metal screen, so as to protect the card or cards contained in the case from possible hacking.

According to another variant embodiment, the housing 29 is accessible from the outside of the flap 24 instead of being accessible from the inside; the outer surface of the flap 24 hence includes the slot 28.

According to another variant embodiment, provision is made for housings on both sides (inside and outside) of the flap 24.

According to another variant embodiment, provision is made for several slots 28 (for example, two), and an antenna 34, the area of which approximately covers the receiving housing or housings 29.

Figure 5:
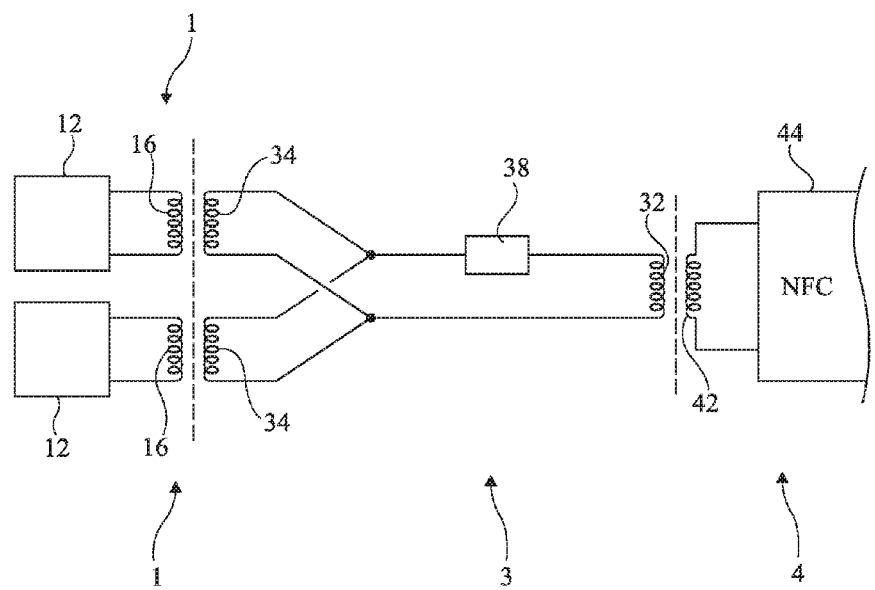
FIG. 5 illustrates the equivalent circuit diagram of another embodiment of the antenna system in coupling with an antenna of a phone and two microcircuit cards.

FIG. 5 illustrates the equivalent circuit diagram of an embodiment of the antenna system 3 in coupling with an antenna 42 of a mobile phone 4 placed in the housing 224 and two cards 1 with a microcircuit 12.

According to this embodiment, provision is made for several slots 28 (for example, two) and several (for example, two) antennas 34 connected in parallel. In this case, the antennas 34 do not overlap, such that the cards 1 housed in the housings 29 in the flap 24, opened via the slots 28, do not overlap either. Moreover, the filter 38 is then also dimensioned to match the impedance and take account of this parallel connection. In practice, the number of cards 1 capable of being recharged depends on the area of the flap 24.

Figure 6:
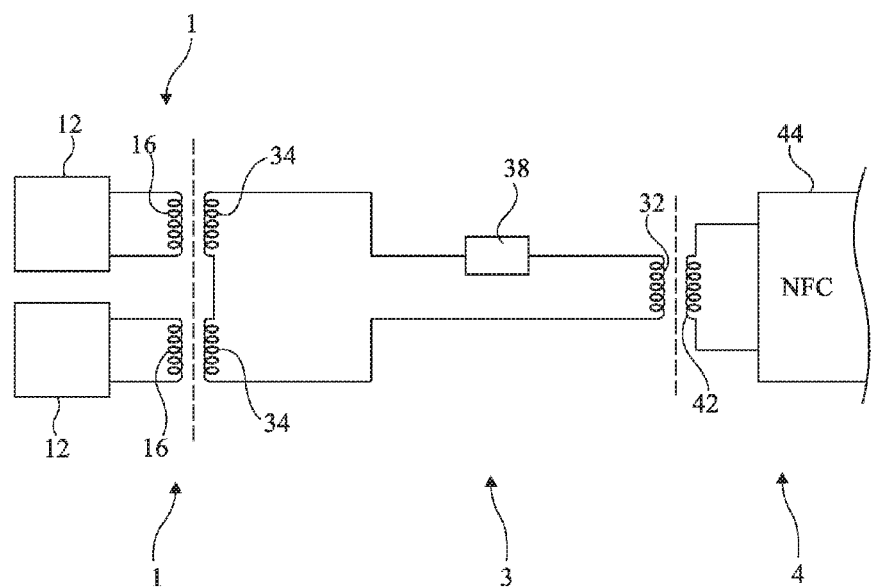
FIG. 6 illustrates the equivalent circuit diagram of yet another embodiment of the antenna system in coupling with an antenna of a phone and two microcircuit cards.

FIG. 6 illustrates the equivalent circuit diagram of another embodiment of the antenna system 3 in coupling with an antenna 42 of a mobile phone 4 placed in the housing 224 and two cards 1 with a microcircuit 12.

According to this embodiment, provision is made for several slots 28 (for example, two) and several (for example, two) antennas 34 connected in series. In this case, the antennas 34 do not overlap, such that the cards 1 housed in the housings 29 in the flap 24, opened via the slots 28, do not overlap either. Moreover, the filter 38 is then also dimensioned to match the impedance and take account of this series connection. In practice, the number of cards capable of being recharged depends on the area of the flap 24.

An advantage of the embodiments described is that henceforth it is possible to use a portable phone case to recharge cards incorporating a battery.

Another advantage of the embodiments described is that the cards are contained in the case in the manner of cards in a wallet, and therefore do not run the risk of falling out or being lost.

An advantage brought about by the use of a portable phone case is that the recharging of the card or cards takes place without constraints for the user, unlike a dedicated charger obliging the user to leave the cards charging on non-transportable devices. Here, insofar as a user generally is in possession of his phone, recharging takes place much more easily.

Another possible use of a portable phone case according to the embodiments described is to exchange data between a portable phone arranged in the housing 224 and a microcircuit card 1 arranged in the receiving housing 29. This use is compatible with applications being executed on a portable phone and enabling communication with a microcircuit card via the near field antenna of the phone. For example, this can be a secure direct exchange of information between the card and the phone in order to share sensitive data (payments, history, etc.) or the exchange of non-sensitive data related for example to the state of the card (remaining battery level, activation and deactivation of battery charging, information from onboard sensors, etc.) enabling an optimization of the management of the card.

Various embodiments and variants have been described. Certain embodiments and variants may be combined and other variants and modifications will become apparent to the person skilled in the art. Moreover, the practical implementation of the embodiments that have been described is within the capabilities of the person skilled in the art based on the functional information given above. In particular, the dimensioning of the case and of the antennas depends on the phone and on the cards for which the case is intended, and is within the capabilities of the person skilled in the art.

The invention claimed is:

1. A case, comprising:
a base configured to receive a portable phone;
a flap coupled to the base, wherein the flap includes:
at least one housing configured to receive a microcircuit card; and
at least one first contactless communication antenna configured to couple with the received microcircuit card; and
wherein the base comprises a second contactless communication antenna configured to couple with the received portable phone, the second contactless communication antenna being electrically connected to the at least first contactless communication antenna.

2. The case according to claim 1, wherein the flap includes an inside surface facing the base when the flap is closed over the base, and wherein the at least one housing is accessible from the inside surface of the flap.

3. The case according to claim 1, wherein the flap includes an outside surface, and wherein the at least one housing is accessible from the outside surface of the flap.

4. The case according to claim 1, wherein the housing is accessible via a slot configured to permit insertion of the microcircuit card.

5. The case according to claim 1, wherein the base is configured to receive the portable phone in a position where a face of the phone carrying a third contactless communication antenna faces the second contactless communication antenna.

6. The case according to claim 1, wherein the at least one first contactless communication antenna is configured to face an antenna of the received microcircuit card.

7. The case according to claim 1, wherein the electrical connection between the at least one first contactless communication antenna first and the second contactless communication antenna passes through a hinge linking the flap to the base of the case.

8. The case according to claim 1, wherein a thickness of the base houses the second contactless communication antenna and a thickness of the flap houses the at least one first contactless communication antenna.

9. The case according to claim 1, wherein the at least one first contactless communication antenna and the second contactless communication antenna are both formed by flat conducting windings.

10. The case according to claim 1, wherein the flap further includes a metal plate positioned between an outer surface of the flap and the at least one first contactless communication antenna.

11. The case according to claim 1, further including at least one housing accessible from the inside of the flap and at least one housing accessible from the outside of the flap.

12. A method for recharging a microcircuit card that includes a first battery, comprising:
placing a portable phone including a second battery in a base of a case that includes a flap;
placing the microcircuit card in the flap of the case, where the case includes a first contactless communication antenna in the flap configured to couple with the received microcircuit card and a second contactless communication antenna in the base configured to couple with the portable phone, said first and second contactless communication antennae being electrically connected to each other; and
recharging the first battery of the microcircuit card using the second battery of the portable phone by passing energy through an antenna of the portable phone, the second contactless communication antenna, the first contactless communication antenna and an antenna of the microcircuit card.

* * * * *